Jan. 6, 1953 N. B. SAUNDERS 2,624,796

SIGNAL TRANSDUCER WITH DISTORTION COMPENSATION AMPLIFIER

Filed June 25, 1946

INVENTOR.
NORMAN B. SAUNDERS
BY Harry M. Saragovitz
ATTORNEY

Patented Jan. 6, 1953 2,624,796

UNITED STATES PATENT OFFICE 2,624,796

SIGNAL TRANSDUCER WITH DISTORTION COMPENSATING AMPLIFIER

Norman B. Saunders, Cambridge, Mass., assignor to United States of America as represented by the Executive Secretary of the Office of Scientific Research and Development Application June 25, 1946, Serial No. 679,126

5 Claims. (Cl. 177—380)

This invention relates to an improved circuit for producing positive feedback to reduce distortion of the wave form of an input signal. In connection with the use of certain types of radar equipment, it has been found that power amplifiers even of advanced design may introduce too much change in the wave form of the input signal.

An object of the invention is to devise improved means for providing positive feedback with a view to more effectively reducing distortion of the wave form of an input signal which passes through a power amplifier. Other objects will appear from the following description.

It has been found by mathematical analysis that a certain definite amount of positive feedback may reduce the fraction of distortion introduced by an entire amplifier to that introduced by the circuit around which the positive feedback may be placed. As illustrative of a preferred means of carrying this principle into effect, I have illustrated the circuit arrangement shown in Figs. 1 and 2.

Figure 2:
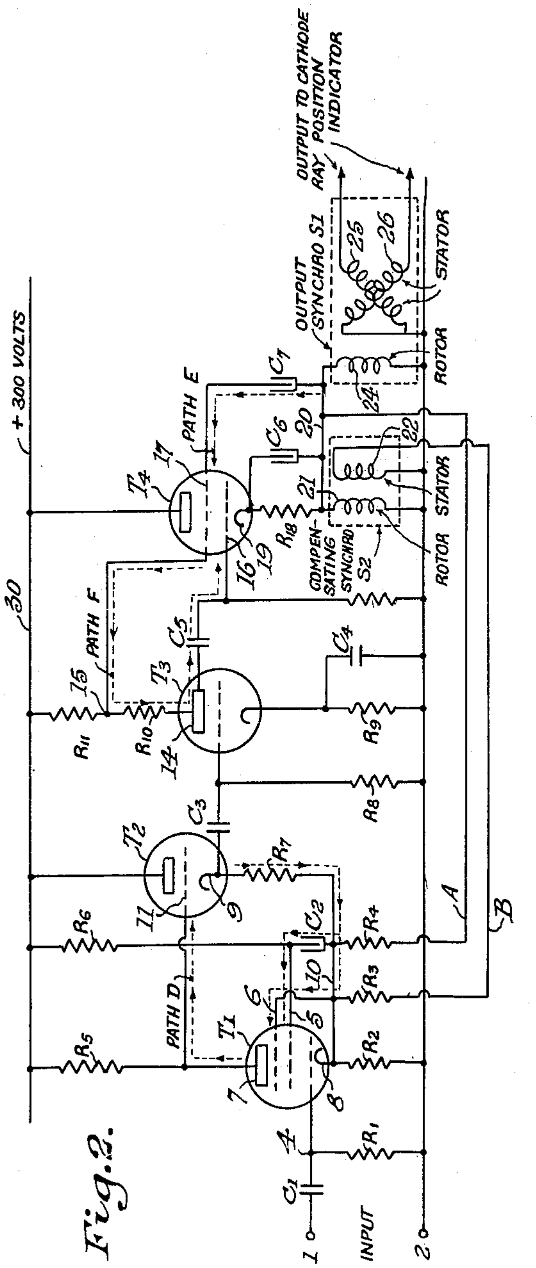

Figure 2 is a schematic circuit diagram showing the application of the invention to a sweep circuit amplifier whose output supplies the excitation for the azimuth synchro of a cathode ray position indicator. (A "synchro" is a device for the electrical transmission of angular position; Technical Manual TM 11-467, War Department 1944, p. 314). Structurally, a synchro has a slotted laminated iron stator having two secondary windings resembling those on the stator of a two phase induction motor, and a single primary winding on the rotor. The secondary voltages vary with rotor position and may be used to excite the deflecting coils of a cathode ray tube to indicate angular position as shown on page 282 of the publication cited above. In such systems where high accuracy is desired, undesirable distortion is introduced by the amplifier and by the iron losses in the synchro. It is an object of the invention to eliminate the distortion arising both in the amplifier and in the synchro and to supply a signal to the cathode ray position indicator which is an exact reproduction of the input signal to the amplifier.

In the preferred embodiment of the invention, the first two tubes of the amplifier T1 and T2 are interconnected to provide a positive feedback from the output of T2 to the input of T1. This may be accomplished as is known in the art by connecting the cathode 9 of tube T2 through a suitable resistor R7 to the cathode 8 of the input tube T1. The amount of feedback may be adjusted by varying the respective cathode resistors R2 and R7. In the preferred adjustment, the regenerative or positive feedback is increased to the verge of instability; that is, the amplification of the first two tubes is adjusted for substantially infinite gain. In order to stabilize the amplifier as a whole when the first two stages are adjusted for infinite gain, it is necessary to provide a negative feedback from the amplifier output stage to some point on the amplifier input. In the preferred embodiment this is accomplished by feedback circuit A connecting point 20 in the output circuit of cathode follower output stage T4 through resistor R4 to point 10 in the cathode circuit of input stage T1. A second negative feedback circuit B, to be described later, connects point 10 through resistor R3 to synchro S2. Feedback resistors R3 and R4 are in parallel with cathode resistor R2 between point 10 and reference potential point 2. The values of resistances R2, R3 and R4 are selected to provide the desired value of negative feedback and at the same time provide the required negative bias for tube T1. The value of resistance R7 is selected to provide the desired value of positive feedback.

Signal is introduced into the amplifier at the grid of the first tube. The amplified and inverted signal appears at the plate of this tube through the usual amplifying characteristics of a pentode having an anode and cathode resistor.

The signal from the plate of the first tube is passed directly to the grid of the second tube T2 which is connected as a cathode follower to the grid of the following power amplifier. A portion of this signal appears upon the cathode of the first tube producing regenerative feedback as outlined above. The entire signal voltage from the cathode of the second tube is passed through the coupling capacitor C3 to the grid of the third tube T3 in conventional fashion.

The cathode of the third tube is connected to the reference potential 2 through an impedance R9 and C4 low at signal frequency and the plate 14 is connected to the supply potential 30 through a high impedance R10 and R11 so that the signal appears amplified and inverted upon the plate 14.

The coupling from the plate of the third tube to the grid of the fourth tube T4 is again conventional. The fourth tube is a power amplifier connected as a cathode follower with its plate connected directly to a low impedance potential supply. An impedance including cathode bias resistor R18 and primary windings 21 and 24 of synchros S2 and S1 respectively is connected between cathode 19 and reference potential 2 such that the proper bias is maintained upon the grid 16 at the normal operating current while the impedance of the synchros with respect to the reference potential at signal frequencies is high.

The signal introduced upon the grid of tube T4 appears substantially unaltered upon the cathode 19, but from an apparent source of low enough impedance to supply the current demanded by the load. A resistor R4 returns from point 20 of the cathode circuit of tube T4 directly to cathode 8 of the first tube so that a portion of the signal upon the cathode of the fourth tube, and hence of the output signal, is returned to the cathode of the first tube. This signal is of the same polarity as that originally applied to the grid of the first tube so that it constitutes negative feedback in path A as previously described.

The negative feedback stabilizes the entire amplifier even though the positive feedback within the negative feedback makes the internal gain of the amplifier infinite. The critical amount of positive feedback is that which makes the gain of the amplifier infinite. This may be arrived at mathematically by starting with the equation for the amplification of an amplifier incorporating feedback:

$$A_v=\frac{A}{1-A\beta}$$

This is a well-known equation and may be found in any standard text on Radio Engineering (see Terman's "Radio Engineering," page 248, second edition, 1937). In the above equation $A_v$ represents the voltage gain of an amplifier having feedback; A is the amplification of the amplifier without feedback; $\beta$ is the fraction of the output voltage which is fed into the input. The sign of $\beta$ is positive for positive feedback, and negative for negative feedback.

According ot the above equation it is necessary only to utilize a value of $\beta$ which will cause $A\beta$ to be equal to 1 in which case the denominator becomes zero and the value of $A_v$ infinite. It will be apparent to one skilled in the art that this condition can be brought about by feeding back just enough signal to the input to give the same output as that which existed. More positive feedback is detrimental.

Figure 1:
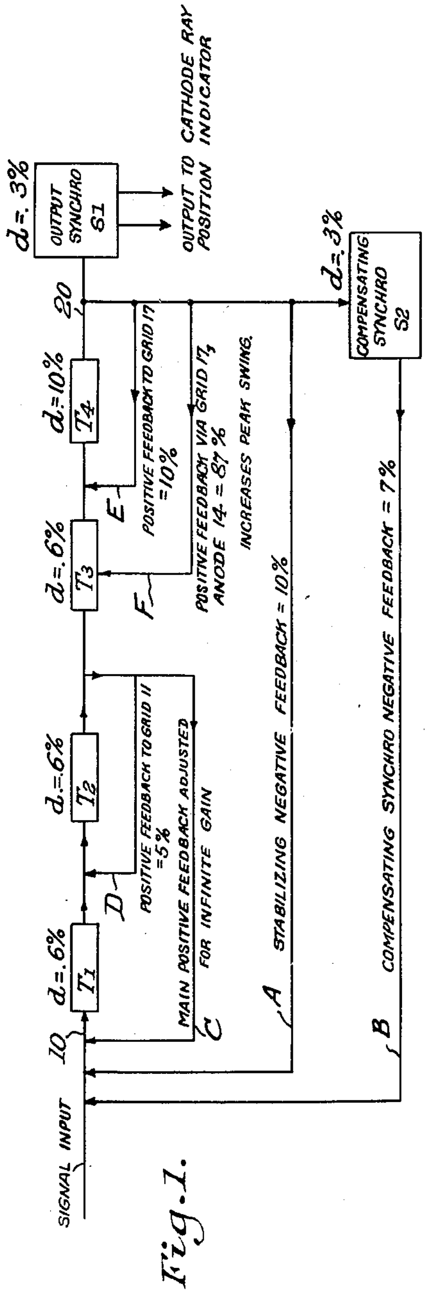

In Fig. 1 the distortion *d* of the various components and parts of the circuit is given in percent, together with the feedback paths. The path of principal interest according to this invention is negative feedback path B traced from point 20 of the amplifier output through primary and secondary windings 21 and 22 or compensating synchro S2, resistor R3 to point 10 of the amplifier input. This circuit feeds about 7% of the amplifier output voltage into the amplifier input in reverse phase. The wave form applied to the input of a synchro is distorted owing to the hysteresis and eddy currents in the iron magnetic circuit of the synchro. Synchros S1 and S2 are identical and introduce identical amounts of distortion. Since the distortion components introduced into the amplifier input by S2 are in reverse phase, the action of this synchro just cancels out the distortion introduced by output synchro S1 beyond the amplifier output terminals. That is, synchro S2 compensates for the distortion due to output synchro S1.

It is not possible to feedback directly from the output of the second synchro because both phase and amplitude of its output are constantly changed mechanically.

It should be observed that the signal applied to the amplifier input appears at its output as if supplied from a source of low internal impedance. The negative feedback path B is the controlling path and insures that the signal at the output is distorted in such a way that in passing through the output synchro it emerges an exact reproduction of the input signal to the amplifier. The output of the second synchro is thus undistorted as outlined above.

In an amplifier designed according to this invention as shown in Fig. 2, several additional feedback paths exist as indicated in paths D, E and F of Fig. 1. Path D from the output cathode 9 of tube T2 provides a positive feedback of approximately 5% to grid 11 of T2. This path shown by the dotted arrows associated with tubes T1 and T2 of Fig. 2, may be traced from cathode 9 of T2, R7, point 10, condenser C2, grid 5 and grid 6, plate 7 of T1 to grid 11 of T2.

Path E provides a positive feedback of approximately 10% from point 20 of amplifier output of grid 17 of tube T4.

Path F provides positive feedback of approximately 87% via path E, just traced, through grid 17 to point 15 on plate resistors R10 and R11 of tube T3, plate 14, condenser C5 to grid 16 of tube T4. The purpose of positive feedback, circuits E and F is to increase the amplification of the output stage T4.

It will be seen therefore that I have designed an efficient positive means of providing feedback to reduce distortion. It should be understood that the invention is not limited to the specific form disclosed and may be modified in various respects in accordance with the scope of the appended claims.

I claim:

1. In an amplifier having a plurality of stages, an output stage of the cathode follower type, an input stage, and a regenerative feedback connection therebetween, said output stage including a tube having an anode, cathode and at least two grids and an output impedance connected from said cathode to a source of negative potential, said input stage including a tube having an anode, cathode and at least one grid and an anode resistor connected from said anode to a source of positive potential and having an intermediate potential point therein, a connection from said input tube anode to the first grid of said output tube, said regenerative connection including a connection from said intermediate point to said second grid, and a condenser having low impedance at the operating frequency connected from said intermediate potential point to the cathode end of said output impedance.

2. An amplifier having a plurality of stages and including input and output circuits, an output device having a primary winding connected to the output circuit and additional windings inductively coupled thereto, and means for compensating for the distortion arising within said output device, said compensating means comprising a negative feedback circuit connected from the junction of the output circuit and said output device to said amplifier input circuit and including therein a second device having a primary winding connected to the output circuit and an additional winding inductively coupled thereto, said primary winding, said additional winding and their magnetic coupling circuit being substantially identical with those of said output device, whereby the distortion arising in said second device is similar to the distortion in said output device and compensates therefor.

3. An amplifier having a plurality of stages and positive and negative feedback circuits for eliminating distortion within the amplifier, input and output circuits and an output device having a primary winding connected to the output circuit and additional windings inductively coupled thereto, and means for compensating for the distortion arising within said output device, said compensating means comprising a negative feedback circuit connected from the junction of the output circuit and said output device to said amplifier input circuit and including therein an inductance coupling network having a magnetic circuit substantially equivalent to the magnetic circuit of said output device, whereby there are produced substantially equivalent distortions in the feedback circuit as in the output device.

4. An amplifier having input and output circuits and positive and negative feedback circuits for eliminating distortion within the amplifier and an output transducer including a first inductance coupling network connected to the output circuit, and means for compensating for the distortion arising within said output transducer, said compensating means comprising a negative feedback circuit connected from the junction of the output circuit and said output transducer to said amplifier input circuit and including therein a second inductance coupling network having a magnetic circuit substantially equivalent to the magnetic circuit of said output transducer and first inductance coupling network.

5. In an electrical system having an input circuit, an amplifier, and an output transducer connected to the output circuit of the amplifier, the combination including positive and negative feedback means for correcting the distortion arising within the amplifier, and means for compensating for the distortion generated in the transducer, said compensating means comprising a negative feedback circuit connected from the output circuit of the amplifier to the input circuit thereof and including therein means for producing distortion substantially identical with said distortions generated within said transducer comprising a device electrically equivalent to said output transducer.

NORMAN B. SAUNDERS.

REFERENCES CITED

The following references are of record in the file of this patent:

UNITED STATES PATENTS

| Number | Name | Date |
| --- | --- | --- |
| 1,535,538 | Maxfield et al. | Apr. 28, 1925 |
| 1,822,758 | Toulon | Sept. 8, 1931 |
| 1,837,851 | Chisholm | Dec. 22, 1931 |
| 2,178,985 | Blumlein | Nov. 7, 1939 |
| 2,194,175 | Wilhelm | Mar. 19, 1940 |
| 2,230,483 | Cage | Feb. 4, 1941 |
| 2,240,715 | Percival | May 6, 1941 |
| 2,245,598 | Llewellyn | June 17, 1941 |
| 2,386,892 | Hadfield | Oct. 16, 1945 |
| 2,400,919 | Crawley | May 28, 1946 |

OTHER REFERENCES

"Radio Handbook," 6th edition, 1939, pp. 318–319.

Edward L. Ginzton: "Balanced Feedback Amplifiers," Proceedings of the Institute of Radio Engineers, vol. 26, No. 11, November 1938, pp. 1367–1379.